(12) United States Patent
Fiorenza De Lima

(10) Patent No.: US 12,474,235 B2
(45) Date of Patent: Nov. 18, 2025

(54) METHOD AND DEVICE FOR SAMPLING PRESSURE BARRIER OF FLEXIBLE PIPES

(71) Applicant: Petróleo Brasileiro S.A.—Petrobras, Rio de Janeiro (BR)

(72) Inventor: Henri Fiorenza De Lima, Vitória (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 421 days.

(21) Appl. No.: 18/086,381

(22) Filed: Dec. 21, 2022

(65) Prior Publication Data

US 2023/0204466 A1    Jun. 29, 2023

(30) Foreign Application Priority Data

Dec. 29, 2021    (BR) ...................... 10 2021 026698 8

(51) Int. Cl.
| | | |
|---|---|---|
| G01N 1/08 | (2006.01) | |
| F16L 11/04 | (2006.01) | |
| F16L 47/34 | (2006.01) | |
| F16L 55/172 | (2006.01) | |
| F16L 55/175 | (2006.01) | |

(52) U.S. Cl.
CPC ................ *G01N 1/08* (2013.01); *F16L 47/34* (2013.01); *F16L 55/172* (2013.01); *F16L 55/175* (2013.01); *F16L 2011/047* (2013.01)

(58) Field of Classification Search
CPC ..... F16L 2011/047; F16L 41/06; F16L 47/34; F16L 55/1683; F16L 55/172; F16L 55/175; G01N 1/08
See application file for complete search history.

(56) References Cited

U.S. PATENT DOCUMENTS

| | | | | |
|---|---|---|---|---|
| 6,103,052 A | * | 8/2000 | Kamiyama | ........... F16L 55/179 264/269 |
| 2012/0132344 A1 | * | 5/2012 | Deleris | .................. B29C 73/10 156/98 |

FOREIGN PATENT DOCUMENTS

| | | |
|---|---|---|
| CN | 210414228 U | 4/2020 |
| CN | 210452924 U | 5/2020 |
| CN | 213563039 U | 6/2021 |

* cited by examiner

*Primary Examiner* — Kristina M Deherrera
*Assistant Examiner* — Gedeon M Kidanu
(74) *Attorney, Agent, or Firm* — Morrison & Foerster LLP

(57) ABSTRACT

The present invention proposes a split clamp (7), typical of trepanning operations in pipes, which allows the intervention with a tool (3) that makes a circular hole in the pipe (1) under analysis, removing layer by layer, until reaching the pressure barrier (2). With this, a sample of the layer of interest is removed to be forwarded for analysis. Such a clamp (7) has means to isolate the pipe (1) from the external environment, introduce the tool (3) and remove the same with the sample, also allowing tightness repair of the pipe (1).

17 Claims, 4 Drawing Sheets

METHOD AND DEVICE FOR SAMPLING PRESSURE BARRIER OF FLEXIBLE PIPES

CROSS-REFERENCE TO RELATED APPLICATION

This application claims priority to Brazilian Application No. BR 10 2021 026698 8, filed on Dec. 29, 2021, and entitled "METHOD AND DEVICE FOR SAMPLING PRESSURE BARRIER OF FLEXIBLE PIPES," the disclosure of which is incorporated herein by reference in its entirety.

FIELD OF THE INVENTION

The present invention is related to the field of flexible pipes. More precisely, the invention applies to any pipe that operates at temperatures higher than the design ones and which is close to the end of its service life; or even those that have exceeded the design life, even without the limit temperature having been disrespected.

DESCRIPTION OF THE STATE OF THE ART

Flexible pipes are often subjected to higher temperatures than those predicted in the design, or even for a longer period of time than originally expected. There are standards that allow an evaluation of the degradation of the pressure barrier, the polymeric layer responsible for the tightness of the pipe. However, frequently, these estimates are based on temperatures that are not precisely determined, which ends up favoring the adoption of safety factors and very conservative decisions, leading, in some cases, to the condemnation of pipes that could continue operating.

The used Technical Recommendation (API 17 TR2) is based on time, temperature, and composition of transported fluids, variables that are often the result of simulations and carry many uncertainties. As a result, it is common to use very conservative safety factors, which penalizes the analysis and even prematurely condemns pipes.

Document CN213563039U addresses to a PVC pipe opening equipment which, when drilling, prevents the tubular product from bending. The device has a work table, which is fixed with a plurality of support plates provided with through holes. The equipment carries out a fast drilling, a fast locating of the drilling position, improves the drilling efficiency, reduces the operator's labor intensity, is supported at the drilling position, and prevents the pipe from producing bending deformation.

Document CN210452924U discloses a device for opening and positioning tubes. The device has a positioning tube, a positioning assembly for determining the location of the opening in the tube, and an adjustment assembly for directing rotation of the positioning assembly.

Document CN210414228U discloses an adjustable fastening device for openings in pipes. Said fastening device includes a first fastening plate and a second fastening plate. The first fastening plate and the second fastening plate have the same structure and both are used together. The fastening assembly is supplied with a positioning component for fastening the tube. The tube to be processed is provided with fastening holes adapted to positioning holes.

The mentioned anteriorities discloses devices used in trepanning or opening holes in pipes. However, none of these documents discloses a device that is capable of drilling a hole in a flexible pipe and removing a layer of interest for sampling.

In face of the difficulties present in the state of the art, and for flexible pipe pressure barrier sampling solutions, there is a need of developing a technology capable of performing effectively and that is in accordance with environmental and safety guidelines. The works found do not have the unique features of this invention, which will be presented in detail below.

OBJECTIVE OF THE INVENTION

It is an objective to enable the recovery of samples from the layer related to the pressure barrier of a flexible pipe for structural integrity analysis and to restore its operability at the end.

BRIEF DESCRIPTION OF THE INVENTION

The present invention proposes a split clamp, typical of trepanning operations in pipes, which allows the intervention with a tool that makes a circular hole in the pipe under evaluation, removing layer by layer, until reaching the pressure barrier. With this, a sample is taken from the layer of interest to be forwarded for analysis. The clamp has means to isolate the pipe from the external environment, introduce the tool, and remove the same with the sample, further allowing the pipe tightness repair. The removed sample allows the accurate determination of the degradation level and the degradation profile along the thickness of the layer that is the "weakness" of the flexible pipe structure.

BRIEF DESCRIPTION OF THE DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

Figure 1:
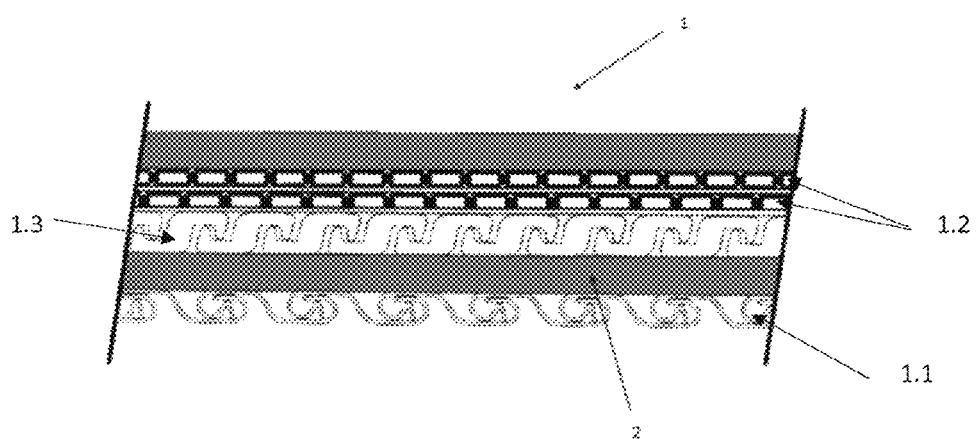
FIG. 1 illustrating the view in longitudinal section of a flexible pipe (1)
Figure 2:
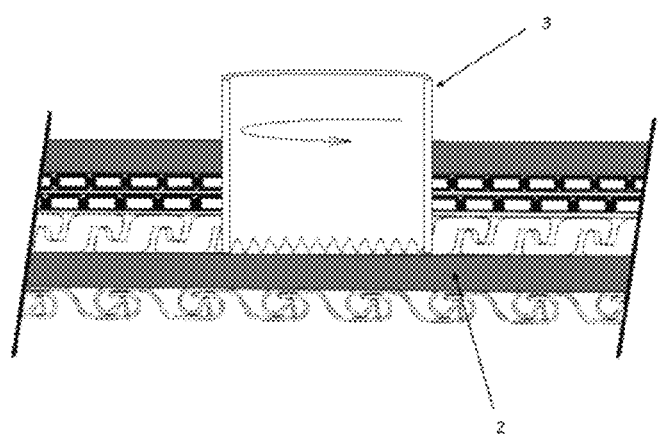
FIG. 2 illustrating the cut with a cup saw, including the following elements: outer layer, thermal insulation, if present, and layers of metallic wires, after depressurizing and cleaning the pipe.
Figure 7:
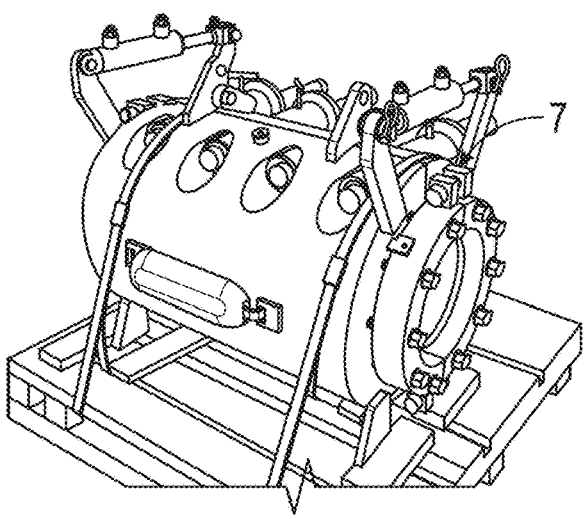
FIG. 7 illustrating the split clamp (7)

The invention has a split clamp (7), shown in FIG. 7, typical of trepanning operations in pipes, which allows the intervention with a tool (3) that makes a circular hole in the pipe (1) under analysis (FIG. 2). The tool (3) removes layer by layer, and it is desirable to have a magnetized component so that it can easily recover the pieces of metallic wires that will be extracted, these wires composed of carbon steel. The tool (3) advances cutting until it reaches the pressure barrier, as shown in FIG. 2. This allows the removal of a sample of the polymeric layer (2) to be sent for analysis, which depends on the material of the barrier.

The split clamp (7) has means to isolate the pipe (1) from the external environment, introduce the tool (3), and remove the same with the layer sample (2), also allowing repair of the tightness of the pipe (1), before it returns to normal operation. After recovering the sample to be analyzed, that is, a circular sample of the pressure barrier (2), this can be sent for analysis, for accurate determination of the level of degradation and the profile of degradation along its thickness, important information to guarantee the integrity condition of the pipe.

Figure 8:
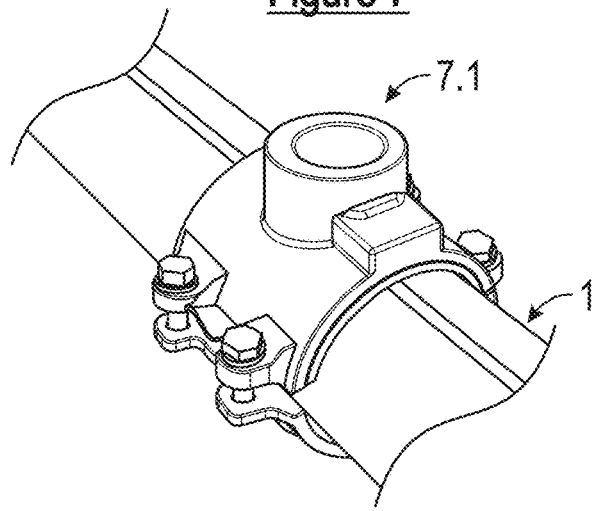
FIG. 8 illustrating the socket present in the split clamp (7)
Figure 9:
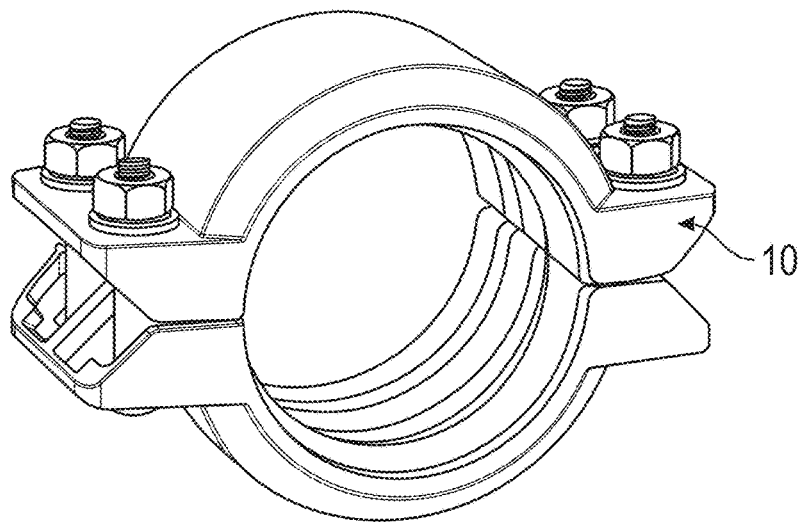
FIG. 9 illustrating the final clamp (10).

The equipment must be operable by ROV or by a diver, who will couple the split clamp (7) to the pipe (1), at the point where the sample must be obtained, preferably in the vicinity of the end connector near the Christmas tree, which is where the temperature is highest and, therefore, where the material to be analyzed is expected to be most degraded. In the split clamp (7), there must be a branch with a flange (FIG. 8), which can be provided with a quick coupling device to fix the cutting equipment, carrying the cutting tool (3), finishing knife (8) and sample collection tool (sample extractor) (9).

The pipe (1), object of the evaluation, must be in production shutdown, depressurized and, preferably, clean, through the circulation of water and pigs. The cutting tool (cup-saw type) (3) is mounted on the flange (7.1) of the socket present in the split clamp (7).

The split clamp (7) is installed on the external side of the pipe to be studied, close to the end considered more critical in terms of temperature for the material in question. The clamp (7) is fixed to the pipe so that the access flange of the cutting tool (3) is positioned in such a way as to allow the coupling of the cutting equipment. The cutting tool (3) must have a fixed slow rotation, and the sea water itself, which surrounds the point of contact between the tool (3) and the different layers of the pipe (1), will be responsible for exchanging heat, cooling the process.

Each of the cut layers is removed until the layer represented by the pressure barrier is reached (the inner shell must be kept intact). The rotation speeds of the tool (3) must be controlled so that there is no overheating, which can mask the results of the analysis, since the degradation of the material, which is to be evaluated, is due to the effect of temperature.

To control the course of the cutting tool (3), it is possible to use a stop structure, adjustable for each pipe structure (1), depending on its diameter and the thickness of each layer.

Temperature control is carried out using low rotation and, alternatively, using forced circulation of sea water at the cutting point. The tool must exert pressure so that the metallic layers can be cut, up to the limit of the stroke predicted for the cut. A tool with a magnet must be inserted in order to collect the pieces of cut profiles.

Figure 3:
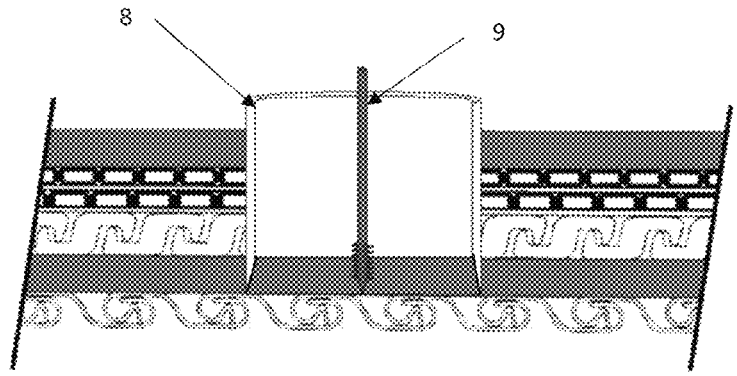
FIG. 3 illustrating the cut of the last layer with a circular knife, without damaging the inner shell and with a means for recovering the sample to be analyzed.

The rotary tool (3) must be removed and a circular knife (8) must be introduced for the final cut (avoiding the risk of damaging the inner shell). This knife (8) must have a slot to be introduced in a specific position, in order to match the saddle formed by the upper generatrix of the pipe (1) and its respective layers. The knife (8) will be compressed against the pressure barrier, at the point of the circular cut made, and cut the rest of the layer, allowing its removal, as shown in FIG. 3.

The loss of wires affects the tensile strength capacity, but as the pipe (1), in the part where the sampling will be carried out, works statically, practically without suffering tensile efforts, this is not a problem. As a contingency, for the retraction of the pipe (1), if it takes place in catenary and then this strength is demanded, it is possible to use some means to support the pipe (1) below the part where the tensile armor wires (1.2) will suffer sectioning.

The reduction in the ability to withstand internal pressure, with damage to the turns of the "zeta" profile of the pressure armor layer (1.3), can be compensated for by using the final clamp (10) which, in addition to fixing the sealing plug and compress the same against the inner shell (1.1), will provide resistance to internal pressure.

The external pressure will continue to have the inner shell (1.1) as a resistant layer, which is why it will not be possible to damage the same without compromising the functionality of the pipe (1). Even with the knife (8), there are internal grooves in the pressure barrier (2), and it is important that the knife (8) has a profile in its blade that matches the shape of some typical structures of flexible pipe shells.

The tool can, alternatively, use a split clamp (7) of the same type that is used in trepanning in rigid pipes (single layer). In fact, this system would be a little simpler, not requiring valves, since in the trepanation of rigid pipes, the aim is to drill the hole, even with the pipe (1) being pressurized, and, in the case in question, it is used as a premise the fact that the pipe (1) is depressurized and clean (filled with sea water).

In any case, the fixing equipment of the cutting device can be similar to that normally used in trepanning. This tool is also known as a Hot Tap Machine and has been used for over 20 years in the offshore and onshore industry. In the onshore industry, a saddle flange is often welded onto the intact pipe, the tool is attached to this flange and a hole is drilled in the pipe to allow access to this new branch.

With the device of this invention, it is necessary to control the depth of cut to prevent the cut from advancing further than necessary. The diameter of the "cup" must be small enough to facilitate plugging the hole as much as possible and large enough to allow the minimum mass of polymeric material required to carry out the analyses. The tool (3) should allow the sample to be recovered as fully as possible, using a specific accessory for this (9).

Figure 4:
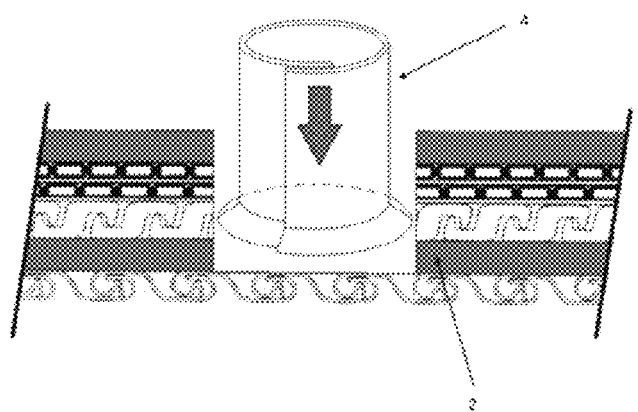
FIG. 4 illustrating the insertion of the repair device (4)

A tool (4) is inserted that will, in a second moment, provide the tightness for maintenance of the pipe (1) in operation, as shown in FIG. 4. Such a sealing can be performed mechanically and/or through the injection of a suitable polymeric sealant. The clamp (7) can then be removed for reuse in future wells to be analyzed.

The invention further includes the sample slicer, for quick analysis in the field, designed according to the diameter and thickness of the pipe layer (2), object of the study. At the end of the process, a "sample extractor" (9) must be introduced to recover the cut part, the objective of this intervention.

Figure 5:
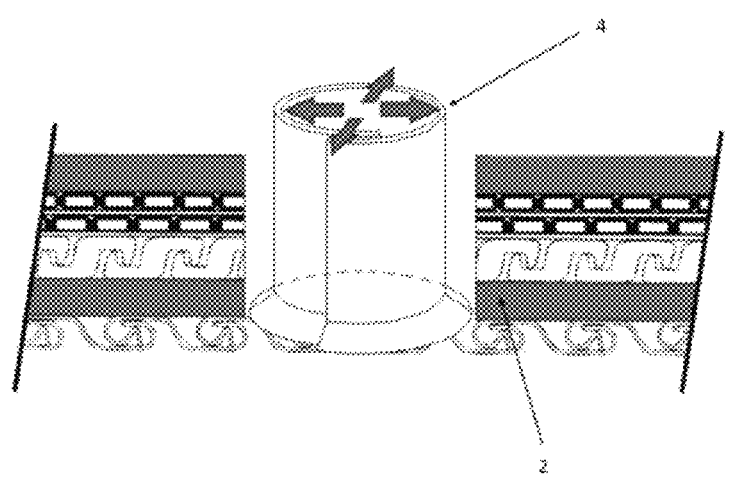
FIG. 5 illustrating the expansion of the repair device (4)
Figure 6:
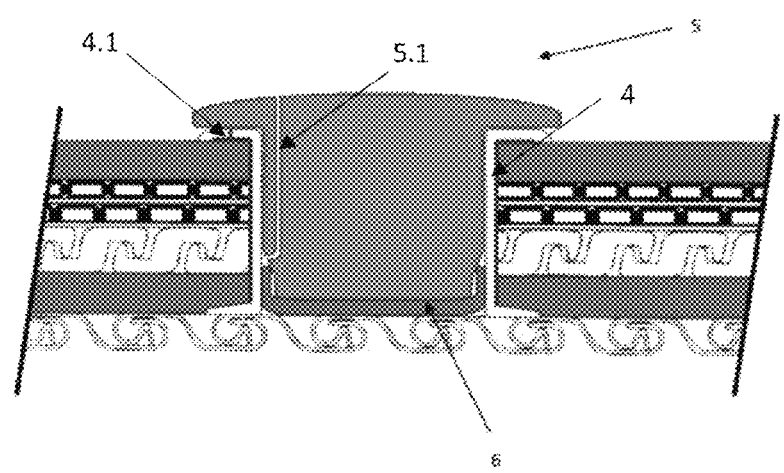
FIG. 6 illustrating the filling of the space to be sealed and over which a metallic belt will be positioned to withstand the internal pressure.

The repair device (4) (FIG. 4), in the proper position, will expand (FIG. 5) and allow the insertion of a plug (5) with a channel (5.1) that allows the injection of sealant to recreate the tightness of the pipe (1). The back part of the plug (5) consists of a wedge that, together with the sealing disk (6) will help to seal the pipe (1), bending the edge of the device to help "bite" the pipe (1) and improve sealing, as shown in FIG. 6.

The flexible pipe pressure barrier sampling method, comprising a split clamp (7), is characterized by:
  shutting down the production, depressurizing and cleaning the pipe (1) to be evaluated;
  coupling said split clamp (7) to the external side of the pipe (1);
  intervening with a circular hole tool (3);
  removing layer by layer of the pipe (1) until reaching the pressure barrier (2);
  removing the circular hole tool (3) and insert a knife (8);
  sampling the pressure barrier (2);
  introducing a repair device (4);
  injecting sealing polymer into the channels (4.1, 5.1) in order to restore the tightness of the pipe;
  installing the final clamp (10), compensating for the discontinuity of the spiral profile of the pressure armor (1.3), allowing the structure of the pipe to resist internal pressure loading.

The invention claimed is:

1. A method for sampling pressure barrier of flexible pipes comprising:
  a) shutting down production, depressurizing, and cleaning a pipe to be evaluated;
  b) coupling a split clamp on an external side of the pipe;
  c) intervening with a circular hole tool through a socket of the split clamp;
  d) removing layer by layer of the pipe until reaching a pressure barrier;
  e) removing the circular hole tool and introducing a knife;
  f) collecting a sample from the pressure barrier using a collection tool;
  g) removing the split clamp;
  h) introducing a repair device and expand the repair device inside a hole made in the pipe;
  i) bending an upper edge of the repair device;
  j) injecting sealing polymer through a first injection channel present in the repair device;
  k) inserting a sealing disk and a sealing plug;
  l) Injecting sealing polymer through a second injection channel present in the sealing plug;
  m) installing a final clamp.

2. The method of claim 1, wherein the cleaning of the pipe takes place through water and pigs.

3. The method of claim 1, wherein the coupling of the split clamp takes place in a vicinity of an end connector close to a Christmas tree.

4. The method of claim 1, wherein temperature control of a cutting process takes place with control and use of low rotation of the circular hole tool and forced circulation of sea water at a cutting point.

5. A device for sampling pressure barrier of flexible pipes in the method of claim 1, wherein the split clamp is provided to fix a rotating equipment and introduce the circular hole tool in order to remove the pipe layers until reaching a layer of interest.

6. The device of claim 5, wherein the split clamp has a branch with a flange or quick coupling connector.

7. The device of claim 6, wherein the circular hole tool is attached to the flange or quick coupling connector.

8. The device of claim 7, wherein the circular hole tool is provided with a stop structure adjustable for each pipe.

9. A device for sampling pressure barrier of flexible pipes in the method of claim 1, wherein the device introduces the knife to cut a rest of a layer at a point of a circular cut made by the circular hole tool.

10. A device for sampling pressure barrier of flexible pipes in the method of claim 1, wherein the device introduces a tool with a magnet to collect pieces of cut metal profiles.

11. A device for sampling pressure barrier of flexible pipes in the method of claim 1, wherein the device introduces a sample extractor to recover a cut part.

12. A device for sampling pressure barrier of flexible pipes in the method of claim 1, wherein the device has the repair device.

13. The device of claim 12, wherein the repair device expands and allows injection of the sealing polymer through the first injection channel to restore tightness of the pipe.

14. A device for sampling pressure barrier of flexible pipes in the method of claim 1, wherein the device has the sealing plug and the sealing disk.

15. A device for sampling pressure barrier of flexible pipes in the method of claim 1, wherein the sealing plug allows injection of sealing polymer through the second injection channel to restore tightness of the pipe.

16. A device for sampling pressure barrier of flexible pipes in the method of claim 1, wherein the device has the final clamp to ensure maintenance of ability of the pipe to be pressurized.

17. The device of claim 5, wherein the device is manipulated by ROV or by diver.

* * * * *